US008340103B2

(12) United States Patent
Tan

(10) Patent No.: US 8,340,103 B2
(45) Date of Patent: Dec. 25, 2012

(54) SYSTEM AND METHOD FOR CREATING A SECURE TUNNEL FOR COMMUNICATIONS OVER A NETWORK

(75) Inventor: Minheng Tan, Coram, NY (US)

(73) Assignee: CA, Inc., Islandia, NY (US)

(*) Notice: Subject to any disclaimer, the term of this patent is extended or adjusted under 35 U.S.C. 154(b) by 1610 days.

(21) Appl. No.: 11/754,677

(22) Filed: May 29, 2007

(65) Prior Publication Data

US 2011/0153793 A1    Jun. 23, 2011

(51) Int. Cl.
*H04L 12/28* (2006.01)
*H04J 3/22* (2006.01)
*G06F 15/173* (2006.01)
*G06F 15/16* (2006.01)

(52) U.S. Cl. ........... 370/395.54; 370/395.5; 370/395.52; 370/395.53; 370/469; 709/238; 709/232

(58) Field of Classification Search ............. 370/395.54, 370/395.5; 709/222, 245, 238, 232
See application file for complete search history.

(56) References Cited

U.S. PATENT DOCUMENTS

| 7,313,613 | B1 * | 12/2007 | Brooking et al. ............. 709/223 |
| 7,356,841 | B2 * | 4/2008 | Wilson et al. .................... 726/15 |
| 7,478,173 | B1 * | 1/2009 | Delco ........................... 709/250 |
| 8,001,269 | B1 * | 8/2011 | Satapati et al. ............... 709/245 |
| 2002/0066036 | A1 * | 5/2002 | Makineni et al. ............. 713/201 |
| 2003/0069993 | A1 * | 4/2003 | Na et al. ......................... 709/245 |
| 2003/0179750 | A1 * | 9/2003 | Hasty et al. .................... 370/390 |
| 2004/0047349 | A1 * | 3/2004 | Fujita et al. .................... 370/389 |
| 2007/0201490 | A1 * | 8/2007 | Mahamuni ............... 370/395.54 |
| 2009/0049199 | A1 * | 2/2009 | Kuik et al. ..................... 709/245 |
| 2009/0296718 | A1 * | 12/2009 | Gefflaut et al. .......... 370/395.53 |
| 2010/0257269 | A1 * | 10/2010 | Clark ............................ 709/226 |

OTHER PUBLICATIONS

W. Townsley and A. Valencia et. al, "Layer two Tunneling Protocol—L2TP" Network Working Group RFC 2661, Aug. 1999, pp. 1-80.*
Townsley, W., et al., "Layer Two Tunneling Protocol 'L2TP'", Network Working Group, Request for Comments: 2661, Category: Standards Track, Aug. 1999, 80 pages.

* cited by examiner

*Primary Examiner* — Joseph Avellino
*Assistant Examiner* — Aftab Nasir Khan
(74) *Attorney, Agent, or Firm* — Pillsbury Winthrop Shaw Pittman LLP

(57) ABSTRACT

A system and method for establishing a virtual local area network (LAN) between a local device and a remote device are provided. The local device and the remote device may each have a physical and a virtual network interface card (NIC), and a virtual driver associated with each respective device virtual NIC may assign a Media Access Control (MAC) address to the virtual NIC and an Internet Protocol (IP) address to the physical NIC. The local device may communicate an IP to MAC address translation to the remote device that maps the assigned IP address to the assigned MAC address. Thereafter, the remote device may transmit secure data that can be received by the local device. For example, the remote device may encapsulate the data being communicated as well as the IP to MAC address translation for the local device into an HyperText Transfer Protocol (HTTP) request.

18 Claims, 4 Drawing Sheets

SYSTEM AND METHOD FOR CREATING A SECURE TUNNEL FOR COMMUNICATIONS OVER A NETWORK

FIELD OF THE INVENTION

The invention relates to a system and method for creating a secure tunnel for communications over a network, and in particular, to using HyperText Transfer Protocol to establish virtual local connections among distinct networks.

BACKGROUND OF THE INVENTION

Data transfer and accessibility tend to be important aspects for any computer system. As network connectivity expands, data access needs may span great physical distances and may traverse increasingly complex communications architecture and channels. Moreover, everyday Internet users have many options to access and share information (e.g., peer-to-peer technology, broadcast or webcast transmissions, and remotely accessing protected networks, among others). As the Internet increases in popularity, however, demands for managing and securing information grow rapidly (e.g., to prevent unauthorized access to a network).

Among other techniques, a network may often incorporate a firewall to exclude unauthorized users and/or traffic from accessing information behind the firewall. For example, a network may be designed to place various addressable locations and/or systems behind or within the protections of the firewall (e.g., the firewall may monitor information passing into or out of a network, applying various security policies to allow or exclude certain traffic). Further, organizations may often employ measures to partition access privileges across various portions of a network (e.g., restricting access to financial records to authorized financial officers). As such, firewalls may protect important information not only against remote threats, but also to implement internal or local security measures.

Even when automated systems constantly monitor a network for certain conditions and/or activities (e.g., unauthorized access attempts), other problems concerning accessibility of the protected network may arise. For example, with many organizations having globally distributed networks, or engaging in joint ventures with other entities, or users desiring expansive and far-reaching connectivity, network architectures should be flexible enough to allow distributed computing to occur, while still protecting information against unauthorized access, data corruption, or other potential security breaches. As such, simply placing a firewall within a network will not necessarily solve all access-related concerns faced by an administrator for a given network. In fact, protecting a network via a firewall may create other issues relating to network management, such as proscribing access to an area or location within a network for authorized remote users.

One technique often used to provide access to a private network for remote users includes establishing a virtual private network (VPN). Most VPNs employ a gateway to provide remote access (e.g., a machine having an interface to both a private network and a public network). For example, a user may log on to the private network by accessing the gateway via the public network interface. Other existing techniques, including circuit-level security technology (e.g., SOCKs or other proxies), also require a gateway. However, gateway configurations typically must be set up by trained professionals and must be maintained by ongoing quality control and service personnel. Furthermore, a common application interface may be need to deploy a VPN solution or other existing gateway solution. As such, to employ a VPN, organizational maintenance costs may increase significantly, as the organization would have to maintain the network, proxy servers, the gateway, and supporting applications, among other things.

Existing systems suffer from these and other problems.

SUMMARY OF THE INVENTION

According to various aspects of the invention, a system and method for establishing a virtual local area network (LAN) between a local device and a remote device may address these and other drawbacks of existing systems. The local device and the remote device may each have a physical and a virtual network interface card (NIC). Further, a virtual driver associated with each respective device virtual NIC may assign a Media Access Control (MAC) address to the virtual NIC and an Internet Protocol (IP) address to the physical NIC. The local device may communicate an IP to MAC address translation to the remote device that maps the assigned IP address to the assigned MAC address. Thereafter, the remote device may transmit secure data that can be received by the local device. For example, the remote device may encapsulate the data being communicated as well as the IP to MAC address translation for the local device into an HyperText Transfer Protocol (HTTP) request.

According to various aspects of the invention, the local device and the remote device may establish intercommunication via an Address Resolution Protocol (ARP) request. For example, the remote device can encapsulate the ARP request into an HTTP request and send the HTTP request to the local device. When the local device responds with the translation, the remote device may have sufficient information to route data to the local device via public HTTP servers, and when the local network receives the routed data, the encapsulated translation may be processed by the local device's NIC. In other words, by assigning a non-vendor MAC address to a virtual NIC and an IP address for a virtual local area network (LAN) to each device on the virtual LAN, data routed among the devices on the virtual LAN may effectively appear as being pushed down on a transmitting device's virtual NIC prior to appearing on a receiving device's virtual NIC. As such, the transmitting device and the receiving device may communicate seamlessly without regard to any intervening firewalls.

According to various aspects of the invention, a secure communications tunnel may be established by a plurality of tunnel endpoints. A first tunnel endpoint may be local to a first addressable location, and a second tunnel endpoint may be local to a second addressable location that can be remote from the first addressable location. The tunnel may traverse public networks and the endpoints may reside behind different firewalls. For example, a local device may locally access the first tunnel endpoint via a router, edge device, concentrator, or other suitable mechanism. The local device may access a remote device as though interconnected by a local area network (LAN) via the secure tunnel, as the second tunnel endpoint may be locally accessible by the remote device via another router, edge device, concentrator, or other similarly suitable mechanism. By communicating data through the tunnel via the first endpoint, which may reside behind a first firewall, the communication may be traverse public networks prior to being received by remote servers, routers, or other devices via the second endpoint, which may in turn reside behind a second firewall. The communicated data may include virtual IP to MAC address translations to facilitate communication among remote systems as though each system were connected to a single local LAN.

Other objects and advantages of the invention will be apparent to those skilled in the art based on the following drawings and detailed description.

DETAILED DESCRIPTION

Figure 1:
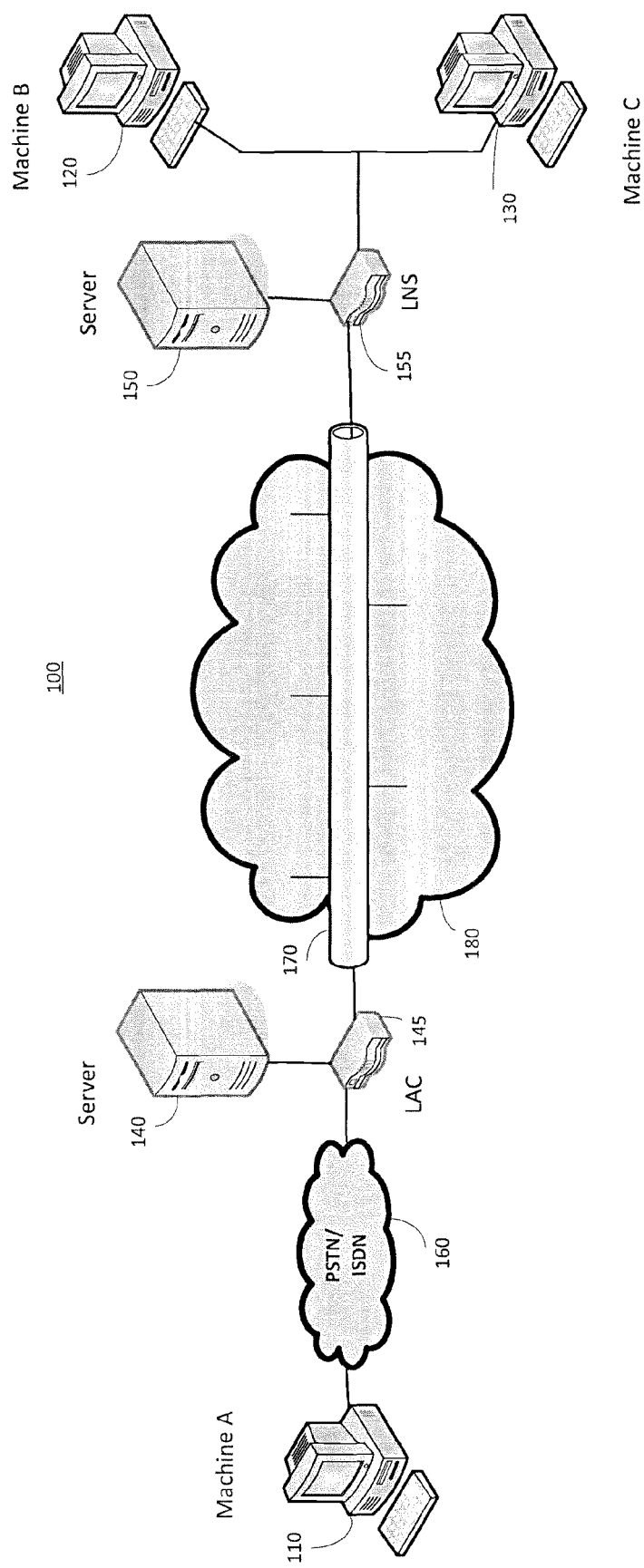
FIG. 1 illustrates a block diagram of an exemplary network architecture according various aspects of the invention.

According to various aspects of the invention, FIG. 1 illustrates a block diagram of an exemplary network architecture 100. As FIG. 1 illustrates, network 100 may include various distinct systems, including, for example, a plurality of machines 110, 120 and 130 that may operate in separate locations. Machines 110, 120, and 130 may be interconnected over various networks, including a public switched telephone network (PSTN) and/or an integrated services digital network (ISDN) 160, a wide area network (WAN) 180, or other networks, as will be apparent. For example, WAN 180 may include a localized server 140 coupled to a local access concentrator (LAC) 145, which may work with or independently from a local area network (LAN). For instance, a server 150, a plurality of machines (e.g., machines 120 and 130), and other network components may be coupled in a LAN arrangement (e.g., via a local network server (LNS) 155). Traffic may enter and exit the LAN via a secure tunnel 170, which may be used to apply various security policies (e.g., to exclude unwanted data from entering the LAN, to protect secure information from exiting the LAN, or to provide other security measures).

Figure 2:
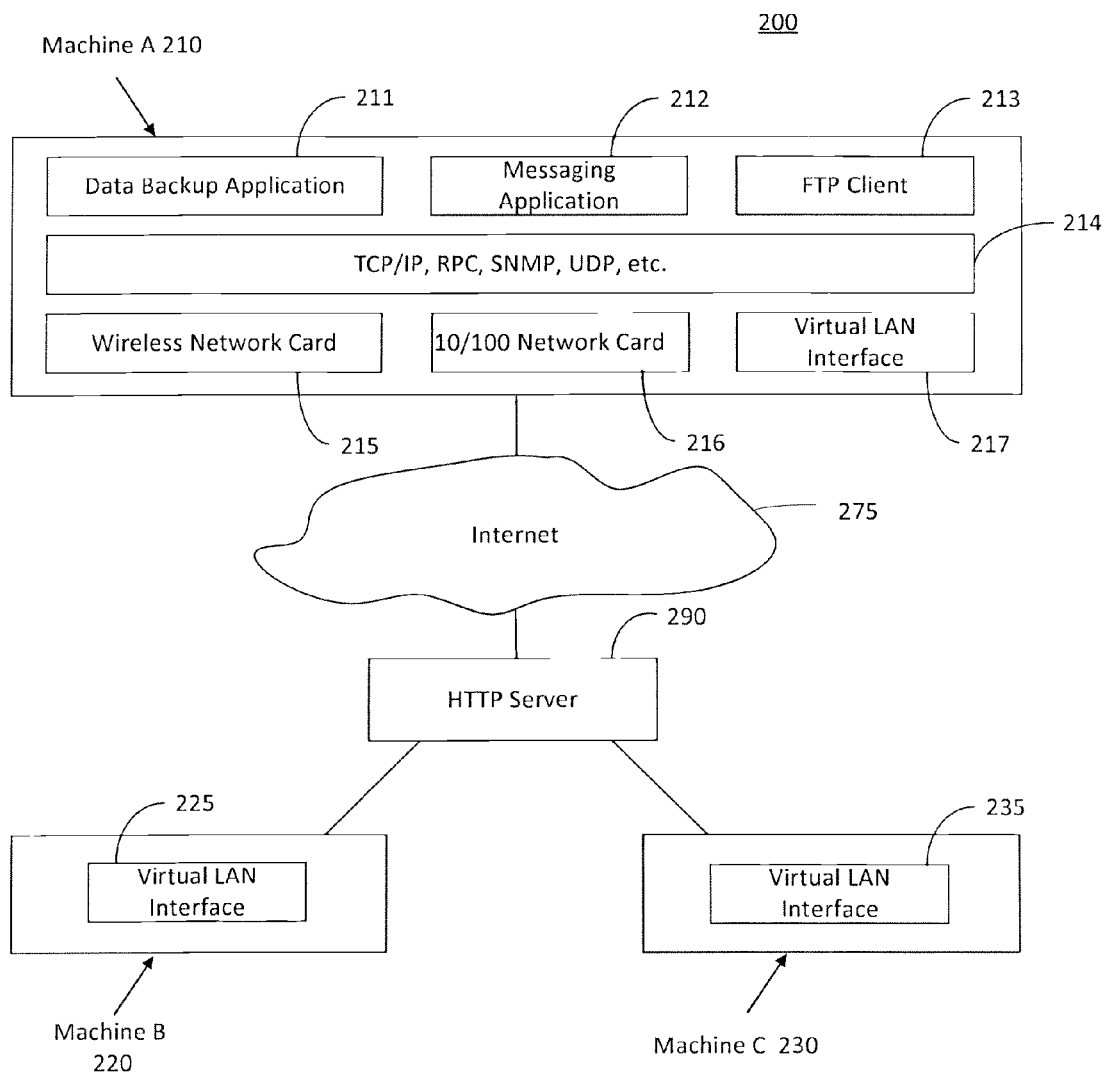
FIG. 2 illustrates a block diagram of an exemplary secure tunnel configuration according to various aspects of the invention.

For example, FIG. 2 illustrates a block diagram of an exemplary secure tunnel configuration 200 according to various aspects of the invention. In this example, machines 210, 220, and 230 may each be protected by a distinct firewall, yet each may be assumed to have access to the Internet 275 via an HyperText Transfer Protocol (HTTP) server 290. As illustrated by FIG. 2, machine 210 may include, among other things, various applications, such as a data backup application 211, a messaging application 212, and a File Transfer Protocol (FTP) client 213. Further, machine 210 may include various network interfaces, including a virtual LAN interface 217, a network card (NIC) 216, and a wireless network card 216. Traffic may pass among machines 210, 220, and/or 230 using various communication protocols 214, including Transmission Control Protocol/Internet Protocol (TCP/IP), Remote Procedure Call (RPC), Simple Network Management Protocol (SNMP), and User Datagram Protocol (UDP), among others. It will be apparent, however, that machine 210 may include other applications, network interfaces, or available protocols, without limitation, and that machines 210, 220 and/or 230 may possess similar properties to each other.

Configuration 200 may provide a secure communications tunnel for Layer-2 (i.e., Data Link Layer) traffic passing among machines 210, 220, and 230, among others. The tunnel may eliminate any need for a distinct gateway by operating on an existing HTTP proxy (e.g., server 290), thus allowing connections among administratively individual machines.

For example, as shown in FIG. 2, any machine having access to an HTTP server or proxy may include a Virtual LAN Interface operating as a virtual network card. Each virtual network card may be assigned a network Media Access Control (MAC) address. The MAC addresses may be selected in a way to avoid assigning MAC addresses within any vendor address space (e.g., an organization may use an address space procured for the organization). Further, local Internet Protocol (IP) addresses may be assigned to each virtual network card (e.g., machine 210 having IP address 10.0.0.1, machine 220 having IP address 10.0.0.2, etc.). The IP addresses may be secured against routing to the Internet (e.g., routers may be configured to drop packets associated with the virtual IP addresses). As such, the virtual network card may appear as a valid and working network segment to higher layers in a protocol stacks. In turn, the virtual network card may encapsulate data from the higher layers (e.g., Layer-7 Application traffic), sending the encapsulated data over the HTTP channel. Similarly, incoming data may be received at the virtual network card and pushed up the protocol stack.

Thus, a virtual LAN environment may be established over the Internet 275 due to widespread availability of HTTP traffic to most networked machines. In other words, the HTTP channel has such profuse availability that nearly all machines coupled to the Internet 275 have an interface to the World-Wide Web, even if the interface routes through a proxy server. The tunnel may be based on Layer-2 traffic to provide a generic connection in which all existing communication protocols operate, thus seamlessly integrating TCP, UDP, and RPC, among other protocols on top of the tunnel. By contrast, in a Layer-3 (i.e., Network Layer) tunneling system, all data passing through the tunnel tends to be Layer-3 data. Many applications use different communication protocols, however (e.g., an application may open a TCP connection to a first machine, open an RCP connection to a second machine, send UDP packets, open a media stream, or communicate in other ways). Securing data over Layer-3 would thus require a distinct tunnel for each of the application's communication needs. Furthermore, the tunnels would have to be tailored for the application's communications needs, preventing reusability for other applications. As such, a Layer-2 tunnel may provide virtual LAN access among machines on distinct networks, irrespective of limitations otherwise attributable to firewall layers, network address translation (NAT), or other factors.

Figure 3:
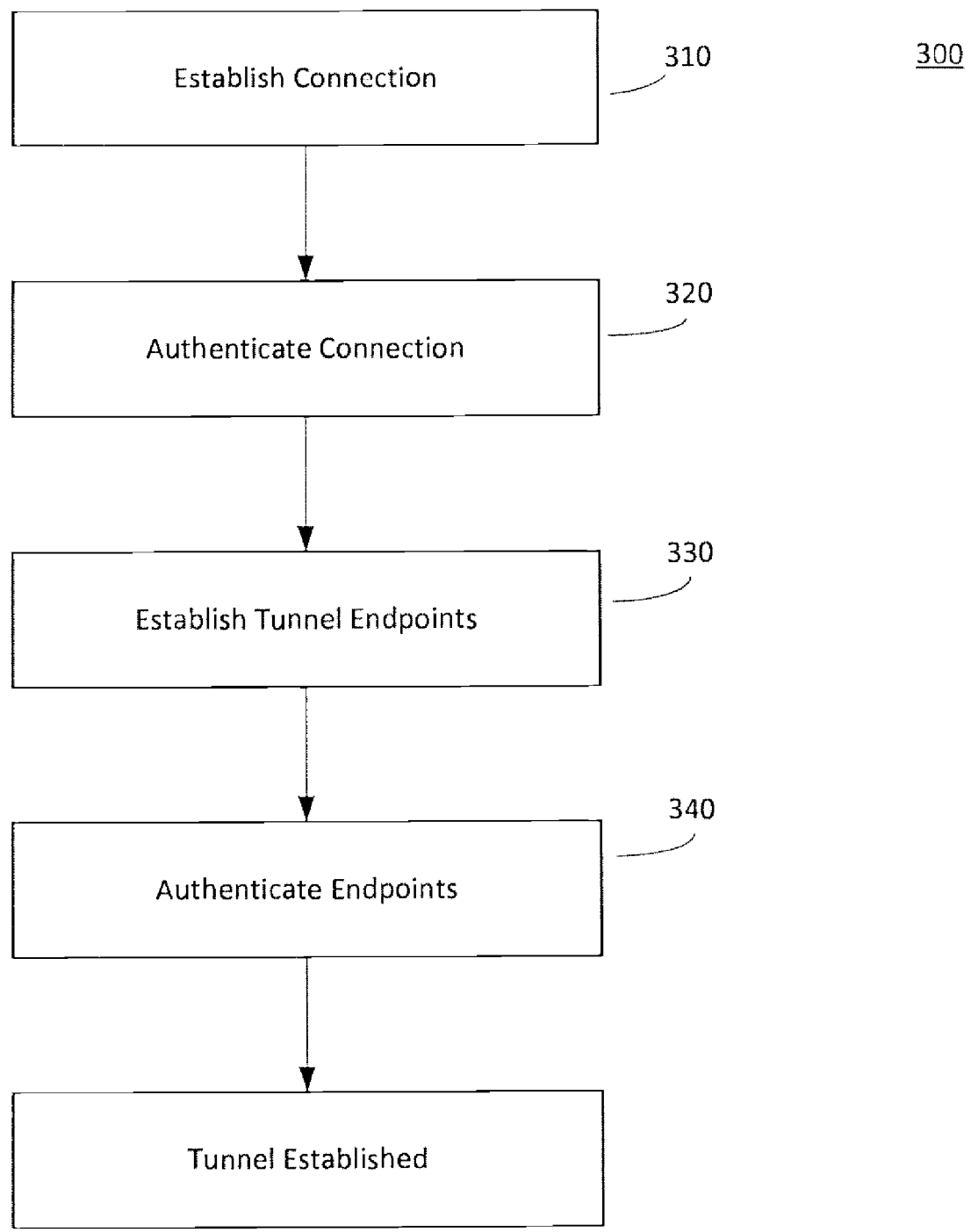
FIG. 3 illustrates a flow chart of an exemplary method for communicating via a secure tunnel according to various aspects of the invention.

Referring to FIG. 3, a flow chart illustrates an exemplary method 300 for communicating via a secure tunnel according to various aspects of the invention. The secure tunnel may provide a secure communications channel between systems distributed across distinct networks. As illustrated in FIG. 3, an initial operation 310 for creating the secure communications tunnel may include establishing a connection between a remote system and a network access point. For example, the remote system may be deployed on a first network protected by a first firewall, and may attempt to establish a connection with a system on a second network, which may be protected by a second firewall. The remote system may attempt to establish the connection by first connecting to a remotely addressable network access point (e.g., an Internet Service Provider (ISP), an Internet backbone, or other network access point). The network access point may authenticate the established connection in an operation 320. For instance, the authentication may include the network access point (e.g., an HTTP proxy) sending a challenge handshake authentication protocol (CHAP) request to the remote system in order to coordinate incremental authentication exchanges.

The remote system may respond to the CHAP request, and when the response can be successfully authenticated, an operation 330 may establish a first endpoint for the secure communications tunnel. The first tunnel endpoint may be established at a local access concentrator (LAC) selected based on a proximity to the remote system (e.g., based on geographic, network, or other proximities). An IP address associated with the first tunnel endpoint (e.g., an IP address of the LAC) may be sent through appropriate routing mechanisms (e.g., via the Internet, various WAN entities, HTTP protocols, etc.), eventually being received by the system on the second network. For example, the system on the second network may be a local network server (LNS), or any suitably similar entity. A second tunnel endpoint may be established at the LNS. Thereafter, an operation 340 may include authenticating the tunnel endpoints. For example, in various implementations, one or more CHAP requests may be exchanged between the tunnel endpoints (e.g., the LAC and the LNS). Upon authenticating the tunnel endpoints, a secure communications channel exists between the endpoints, thereby creating the secure tunnel for communications between the endpoints.

Subsequent to establishing the tunnel, machines connected to the tunnel endpoints may communicate with each other, CHAP requests may be exchanged to maintain the secure connections, and the endpoints may pass data to interfaces associated with their respective machines to create a virtual LAN connection via the tunnel. For example, data from an application associated with a machine at the first endpoint may be encapsulated by a virtual network card associated with the machine. The encapsulated data may traverse the tunnel (e.g., through existing WAN interfaces) prior to arriving at the second endpoint, which provides the encapsulated data to a virtual network card associated with a machine at the second endpoint. The virtual network card at the second point may strip away layers of encapsulation and push the data up the protocol stack. Thus, a secure connection between a remote system and a private network may be established via a secure channel over public networks. As communication continues between the endpoints, additional CHAP requests may be exchanged to ensure that the connection has not subsequently been compromised, data may be encrypted for protection during transmission, or various other security measures may be employed, as will be apparent.

Figure 4:
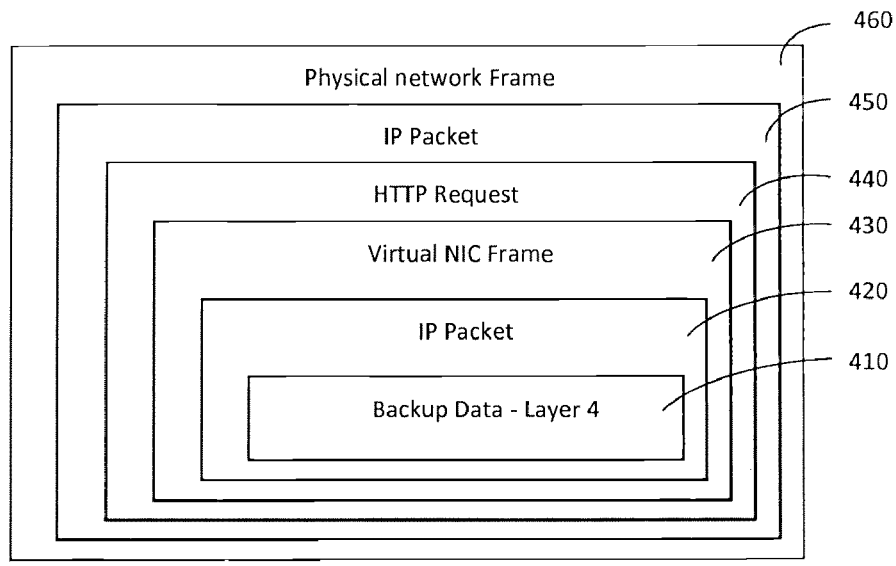
FIG. 4 illustrates a block diagram of an exemplary data encapsulation according to various aspects of the invention.
Figure 4:
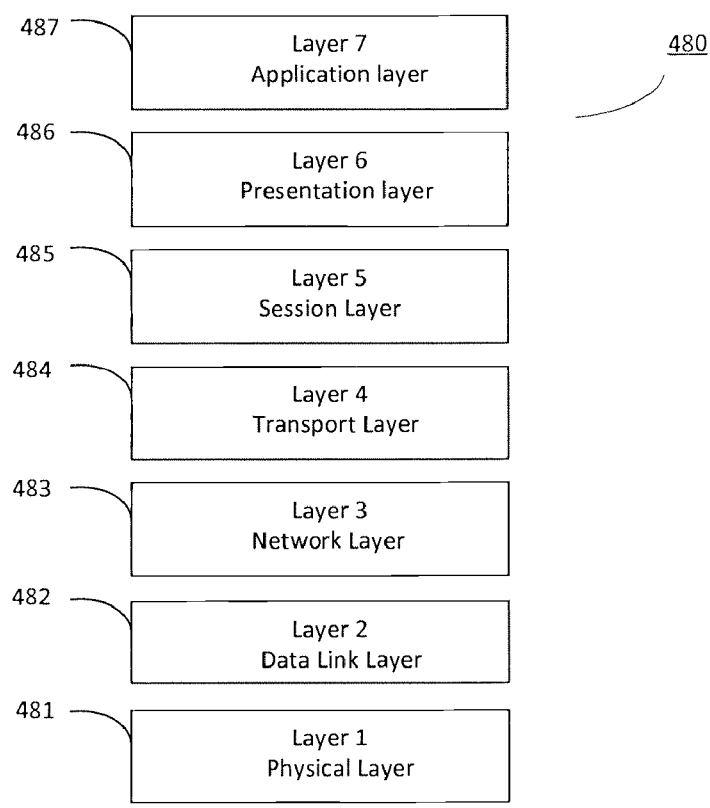

FIG. 4 illustrates a block diagram of an exemplary technique for encapsulating data according to various aspects of the invention. As illustrated in FIG. 4, data traversing a secure HTTP communications tunnel may be encapsulated according to a seven Layer Open System Interconnection (OSI) model 480. As illustrated, the various layers of OSI model 480 include a Physical Layer 481 (i.e., Layer-1); a Data Link Layer 482 (i.e., Layer-2), a Network Layer 483 (i.e., Layer-3), a Transport Layer 484 (i.e., Layer-4); a Session Layer 485 (i.e., Layer-5), a Presentation Layer 486 (i.e., Layer-6), and an Application Layer 487 (i.e., Layer-7).

The secure communications tunnel may be established using incremental authentication processes (e.g., CHAP, or other suitable authentication protocols). By authenticating incrementally, certain parameters may be propagated and shared among machines to establish and verify an addressable location. For example, an addressable location may be verified to determine whether a certain addressable location actually corresponds to an addressable location that a user has attempted to contact. Similarly, machines at a plurality of addressable locations may communicate incrementally from one point to another. As such, using incremental communications, communications between systems at opposing ends of the tunnel may communicate with each other in a way that may be transparent to users of either system (e.g., as systems interconnected on a shared virtual LAN), even when the systems may be protected by firewalls or other restrictions.

According to various techniques as described herein, data may be encapsulated within a structure 400 that can securely transmit information through public networks using a tunnel that can have endpoints behind distinct firewalls. As such, data encapsulated within structure 400 may be transmitted into or out of private networks protected by firewalls using publicly available intermediate networking systems. For example, as illustrated in FIG. 4, a user of a first machine (e.g., Machine A) may desire to transmit backup data to a remote replication system or other data backup solution (e.g., Machine B). Even though Machine A and the remote system may both be protected by different firewalls, encapsulating data within structure 400 may allow the backup data to be transmitted from Machine A to Machine B as though they were interconnected over a virtual LAN environment.

A virtual networking application may create a virtual NIC for each machine that attempts to join the virtual LAN. For example, a unique network MAC address may be assigned to distinct virtual network cards for Machine A, Machine B, or any other system that may attempt to join the virtual LAN. The application may be configured to assign MAC addresses that do not fall within any vendor's address space. For example, an organization may assign MAC addresses based on a procured address space not used by any other organizations or hardware vendors. The virtual NIC may appear to higher Layers in stack 480 as a valid NIC.

Further, the virtual networking application may assign IP addresses to distinct physical NICs for Machine A, Machine B, or any other system that may attempt to join the virtual LAN (e.g., 10.0.0.1, 10.0.0.2, 10.0.0.3, 10.0.0.4, etc.). The application may further be configured to assign non-public IP addresses (e.g., local addresses that cannot be routed over the Internet). As such, routers would drop any packets associated with the assigned IP addresses, providing a measure of protection against security breaches.

The secure communications tunnel may be established between systems that send data over the virtual LAN. For ease of description, Machine A may be to be assumed as transmitting data to Machine B. In such an exemplary case, the virtual networking application of Machine A encapsulates data within structure 400 prior to sending the encapsulated data into a public network. For example, to send Layer-4 backup data 410, an Address Resolution Protocol (ARP) request 420 would be sent to Machine A's virtual NIC to resolve IP addresses of destination systems (e.g., Machine B in this example). The virtual NIC may receive the ARP request 420 as an ARP frame 430, and may encapsulate the frame 430 into an HTTP request 440. The HTTP request 440 may be sent to any suitable HTTP server or proxy. When sending the request 440 to the HTTP server, the encapsulated data may be pushed down to the actual physical NIC, thus again pushing the data down the OSI stack from Layer-3 to Layer-2.

Once encapsulated within physical network frame 460, the data may be passed on to a router or a proxy. Subsequently, the HTTP server receives the encapsulated data frame via a physical network card prior to forwarding the data frame to Machine B. When the frame 460 arrives at Machine B through its physical NIC, the frame may be pushed up the protocol stack 480. The virtual network card of Machine B then receives the data and continues to push the data up stack 480. As such, the data may effectively appear as having been pushed down to the virtual NIC of Machine A before subsequently arriving at Machine B via its virtual NIC. Machine B would then respond to the received ARP request by providing the appropriate MAC address. The response may also be encapsulated within frames 410-460 in like fashion as described above, reversing the route taken by the data sent from Machine A to Machine B. Machine A would have information relating to the IP to MAC translation for Machine B. Thus, data may easily be sent to and from the systems attached to the virtual LAN via the HTTP server. Further, data may be sent to any other system on the virtual LAN via the HTTP server upon securely exchanging the IP to MAC translation.

Implementations may be made in hardware, firmware, software, or any combination thereof. The invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described in the above disclosure in terms of specific exemplary aspects and implementations of the invention, and performing certain actions. However, those skilled in the art will recognize that such descriptions are merely for convenience and that such actions in fact result from computing devices, processors, controllers, or other devices executing the firmware, software, routines, or instructions.

Aspects and implementations of the invention described in the above disclosure may be described in terms of particular features, structures, or characteristics, but every aspect or implementation may not necessarily include the particular features, structures, or characteristics. Further, when particular features, structures, or characteristics are described in connection with an aspect or implementation, it is understood that it will be apparent to effect such features, structures, or characteristics in connection with other aspects or implementations, whether or not explicitly described. Thus, various changes and modifications to the above disclosure may be made, without departing from the scope and spirit of the invention. The specification and drawings, as such, are to be regarded as exemplary only, and the scope of the invention to be determined solely by the appended claims.

What is claimed is:

1. A method for creating a secure network communications tunnel, comprising:
   assigning a Media Access Control (MAC) address to a virtual network interface card associated with a local device and an Internet Protocol (IP) address to a physical network interface card associated with the local device;
   communicating an IP to MAC address translation associated with the local device to a remote device, wherein the IP to MAC address translation maps the IP address assigned to the physical network interface card associated with the local device to the MAC address assigned to the virtual network interface card associated with the local device;
   receiving, from the remote device, an incoming HTTP request that encapsulates secure data and the IP to MAC address translation associated with the local device; and
   transmitting an outgoing HTTP request that encapsulates secure data and an IP to MAC address translation associated with the remote device to the remote device, wherein transmitting the outgoing HTTP request to the remote device includes:
   sending Layer-3 data to the virtual network interface card associated with the local device, wherein the Layer-3 data includes the IP to MAC address translation associated with the remote device, which maps an IP address assigned to a physical network interface card associated with the remote device to a MAC address assigned to a virtual network interface card associated with the remote device;
   encapsulating the Layer-3 data into Layer-2 data;
   encapsulating the Layer-2 data into the outgoing HTTP request;
   sending the outgoing HTTP request to the physical network interface card associated with the local device; and
   encapsulating the outgoing HTTP request into a physical data frame to transmit the secure data encapsulated therein to the remote device via an HTTP server or proxy.

2. The method of 1, further comprising receiving, at the local device, an initial HTTP request that encapsulates an Address Resolution Protocol (ARP) request from the remote device, wherein the local device communicates the IP to MAC address translation associated with the local device to the remote device in response to receiving the initial HTTP request that encapsulates the ARP request.

3. The method of claim 1 wherein different firewalls protect the local device and the remote device.

4. The method of claim 1 wherein the MAC address assigned to the virtual network interface card associated with the local device does not fall within any network interface card vendor address space.

5. The method of claim 1, wherein the MAC address assigned to the virtual network interface card associated with the local device falls within a reserved address space.

6. The method of claim 1, wherein the IP address assigned to the physical network interface card associated with the local device comprises a local address that cannot be routed over public networks.

7. A system for creating a secure network communications tunnel, comprising:
   a local device that has a physical network interface card and a virtual network interface card; and
   a virtual networking application configured to:
      assign a Media Access Control (MAC) address to the virtual network interface card associated with the local device and an Internet Protocol (IP) address to the physical network interface card associated with the local device;
      communicate an IP to MAC address translation associated with the local device to a remote device, wherein the IP to MAC address translation communicated to the remote device maps the IP address assigned to the physical network interface card associated with the local device to the MAC address assigned to the virtual network interface card associated with the local device;
      receive one or more incoming HTTP requests from the remote device, wherein, the one or more incoming HTTP requests encapsulate secure data and the IP to MAC address translation associated with the local device;
      send Layer-3 data associated with one or more outgoing HTTP requests to the virtual network interface card associated with the local device, wherein the Layer-3 data associated with the one or more outgoing HTTP requests includes an IP to MAC address translation that maps an IP address assigned to a physical network interface card associated with the remote device to a MAC address assigned to a virtual network interface card associated with the remote device;

encapsulate the Layer-3 data associated with the one or more outgoing HTTP requests into Layer-2 data;

encapsulate encapsulating the Layer-2 data into the one or more outgoing HTTP requests;

send the one or more outgoing HTTP requests to the physical network interface card associated with the local device;

encapsulate the one or more outgoing HTTP requests into one or more physical data frames; and transmit the one or more physical data frames to the remote device via an HTTP server or proxy to transmit secure data contained in the one or more outgoing HTTP requests from the local device to the remote device.

8. The system of claim 7, wherein the virtual networking application is configured to communicate the IP to MAC address translation associated with the local device to the remote device in response to an initial HTTP request from the remote device that encapsulates an Address Resolution Protocol request.

9. The system of 7, wherein different firewalls protect the local device and the remote device.

10. The system of claim 7, wherein the MAC address assigned to the virtual network interface card associated with the local device does not fall within any network interface card vendor address space.

11. The system of claim 7, wherein the MAC address assigned to the virtual network interface card associated with the local device falls within a reserved address space.

12. The system of claim 7, wherein the IP address assigned to the physical network interface card associated with the local device comprises a local address that cannot be routed over public networks.

13. A network device for communicating over a secure network tunnel, wherein the network device comprises one or more processors configured to:

receive, from a remote device, an address translation associated with the remote device, wherein the address translation received from the remote device maps an Internet Protocol (IP) address assigned to a physical network interface card associated with the remote device to a Media Access Control (MAC) address assigned to a virtual network interface card associated with the remote device;

send Layer-3 data associated with one, or more outgoing HTTP requests to a virtual network interface card associated with the network device, wherein the Layer-3 data includes an address translation between an IP address assigned to a physical network interface card associated with the network device and a MAC address assigned to a virtual network interface card associated with the network device;

encapsulate the Layer-3 data associated with the one or more outgoing HTTP requests into Layer-2 data;

encapsulate the Layer-2 data into the one or more outgoing HTTP requests;

send the one or more outgoing HTTP requests to the physical network interface card associated with the network device; and transmit one or more physical data frames that encapsulate the one or more outgoing HTTP requests to the remote device via an HTTP server or proxy to transmit secure data contained in the one or more outgoing HTTP requests to the remote device.

14. The network device of claim 13, wherein the one or more processors associated with the network device are configured to receive the address translation associated with the remote device from the remote device in response to an initial HTTP request sent to the remote device that encapsulates an Address Resolution Protocol request.

15. The network device of claim 13, wherein different firewalls protect the network device and the remote device.

16. The network device of claim 13, wherein the MAC address assigned to the virtual network interface card associated with the network device or the remote device does not fall within any network interface card vendor address space.

17. The network device of claim 13, wherein the MAC address assigned to the virtual network interface card associated with the network device or the remote device falls within a reserved address space.

18. The network device of claim 13, wherein the IP address assigned to the physical network interface card associated with the network device or the remote device comprises a local address that cannot be routed over public networks.

* * * * *